Nov. 7, 1950     L. C. ROBERTS     2,528,786
INSECT SCREEN FOR MOTOR CAR WINDOWS
Filed Nov. 7, 1947
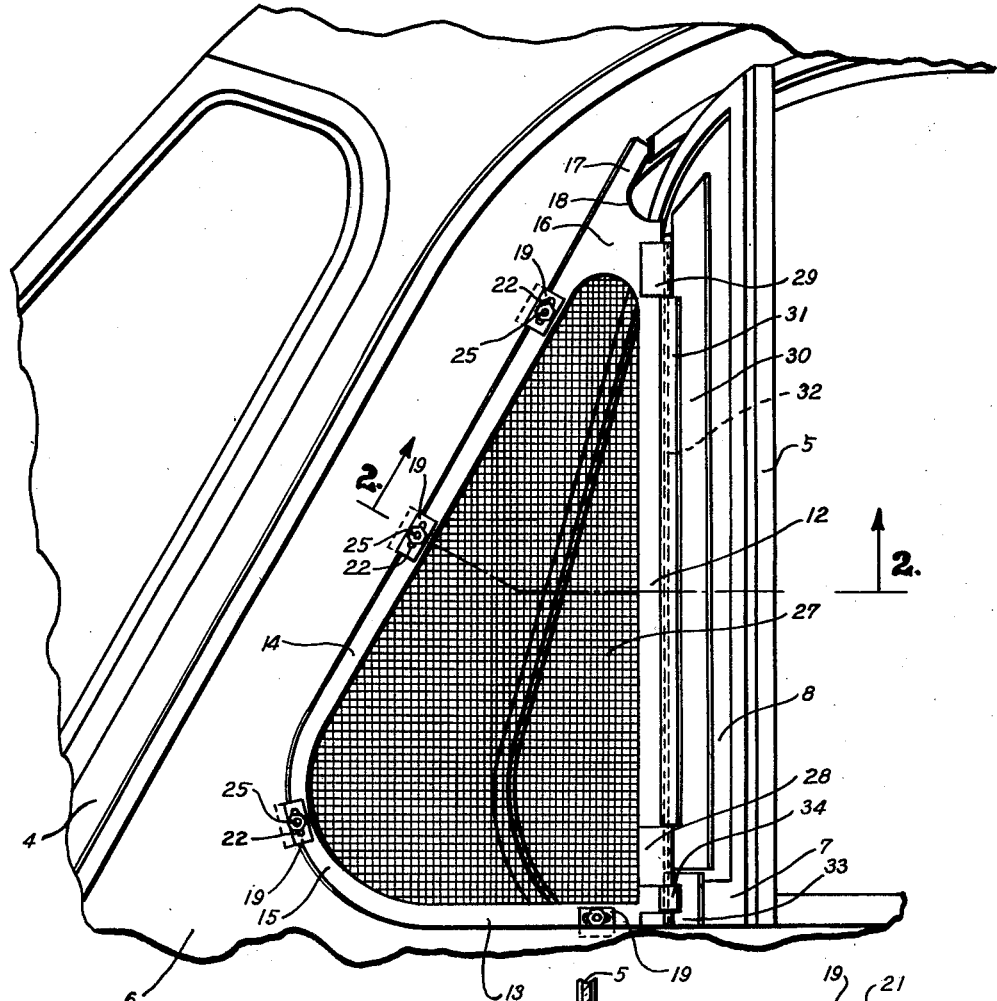
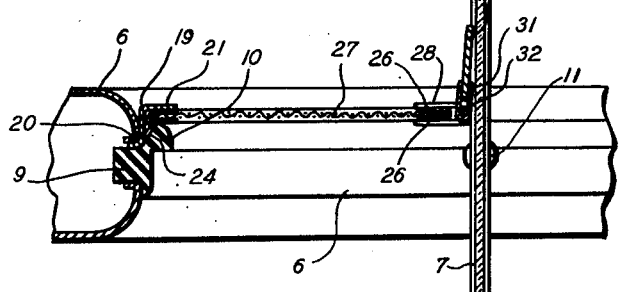
Inventor
LEE C. ROBERTS
By Alfred R. Fuchs
Attorney Patented Nov. 7, 1950

2,528,786

UNITED STATES PATENT OFFICE 2,528,786

INSECT SCREEN FOR MOTOR CAR WINDOWS

Lee C. Roberts, Kansas City, Mo.

Application November 7, 1947, Serial No. 784,733

8 Claims. (Cl. 160—40)

1

My invention relates to insect screens for motor car windows, and more particularly to an insect and bug screen for the swiveled front windows in the doors of automobiles.

My invention particularly applies to the ventilating windows that are located in the forward portions of the doors in front of the windows that move up and down in the front doors of an automobile. Such windows are mounted so that the same can be swung into a position that the forward portion thereof, that is, the portion forwardly of the pivots, will swing into the interior of the automobile body when the window is opened while the portion rearwardly of the pivotal axis swings outwardly.

When such a pivotally mounted window is opened so that the rearwardly extending portion inclines forwardly from the pivotal axis on the outer side of the automobile body, air is deflected into the body of the automobile and upon the driver and passengers, especially those passengers riding in the front seat of the automobile. While such a position deflects a considerable volume of air into the automobile, at the same time bugs and insects are also deflected or blown into the interior of the automobile through the space between the window placed at such an angle as above referred to and the forward end of the window opening. The entry of such insects and bugs into the interior of an automobile frequently has caused serious accidents.

It is a purpose of my invention to provide means whereby such bugs, insects and other matter will not enter the automobile body through such a window opening, when the window is in such an angular position as above referred to, to permit the cooling effect of the air to be obtained without any danger from insects and bugs being blown or deflected into the automobile through the opening between the forward inclined face of the window and the forward edge of the window opening. Due to the fact that the automobile is traveling forwardly and the window is at an oblique angle, there will be no danger of bugs or insects or other foreign matter being blown or deflected into the automobile body from the rear inclined face of the obliquely extending window.

The purpose of my invention is accomplished by providing a screen which fits in the opening for the pivoted window forwardly of the pivotal axis thereof, said screen being mounted in such a position that the window can be opened or closed without any interference therewith by the screen and at the same time the screen will prevent passage of any bugs or insects through the opening when the window is in an open position.

In view of the fact that the window may assume a plurality of different angular positions relative to the screen, which is mounted in a fixed position in the opening, means is provided for preventing passage of any insects or bugs between the window pane of the pivoted window and the frame of the screen in any angular position of said window in which bugs or insects could otherwise enter the automobile body.

It is a further purpose of my invention to provide means for the ready mounting of the screen in position in the window opening, so as to act as a means for preventing the entrance of bugs and insects into the interior of the automobile body.

Other objects and advantages of my invention will appear as the description of the drawings proceeds. I desire to have it understood, however, that I do not intend to limit myself to the particular details shown or described, except as defined in the claims.

In the drawings:

Fig. 1 is a fragmentary perspective view of an automobile body, showing my invention applied thereto, as viewed from a position slightly forwardly from the window opening at one side of the automobile body.

Fig. 2 is a section taken on the line 2—2 of Fig. 1, and

Fig. 3 is a perspective view of the holding clip used for mounting the screen in position.

Referring in detail to the drawings, my improved insect screen is shown as being applied to an automobile body 4 having a pivoted window 5 mounted in the window opening at the forward end of the door 6 that is located at the forward end of the automobile body, said window having a frame 7 and being provided with a pane 8. In Fig. 1 said window is shown as being substantially perpendicular to the face of the door 6.

The door 6, as will be obvious from Fig. 2, is provided with a strip of compressible material 9, which serves as a weather strip, which may be of various shapes, but is ordinarily of the shape shown in Fig. 2 so that there is a projecting portion 10 that lies outwardly from the window when the swiveled window 5 is in closed position. The door 5 is swiveled about the axis of the swiveled members 11, as will be obvious from Fig. 2.

My improved insect screen comprises a frame that is of substantially the shape of the opening in which the screen is to be located, being of a generally triangular shape and having a vertical portion 12 that is straight, a bottom straight horizontal portion 13, an inclined or obliquely extending portion 14, which is connected with the portion 13 by means of a curved portion 15, and a connecting portion 16 connecting the converging ends of the portions 12 and 14 of the frame. Extending beyond the portion 16 in substantial alignment with the inclined portion 14, is a finger or extension 17, which extends into the space between the upper end of the portion 16 and the swiveled window 5, the portion 16 joining the finger 17 in a curve 18 providing a cut-away portion or recess to accommodate the window 5 in its movements about its pivotal axis.

A plurality of clips 19 is provided. The clips 19 have a short flange 20 and a longer flange 21 thereon, and in assembling the device in a window opening the clips 19 are put in position with the flanges 20 between the metal portions of the door frame 6 and the compressible weather strip 9, while the flanges 21 thereof overlie the frame of the screen. Said frame is provided with suitable openings for screw-threaded headed securing members which have the heads thereof mounted between the portion 10 of the compressible strip 9 and the frame member, and which extend through the slots 22 in the flanges 21. The connecting portions 23 of the clips have triangular prongs 24 struck out from the same, which enter the compressible weather strip, as will be obvious from Fig. 2, and inasmuch as these prongs make it difficult to move the clips 19 after having been once placed in position, the slots 22 are provided so that the securing elements can be more readily passed through the openings in the frame provided therefor and the slotted openings 22 in the clips. Nuts 25 are applied to the outer ends of the securing elements to fasten the screen in place. Preferably, the securing clips are arranged as shown in the drawings, with one thereof near the rear end of the bottom member 13 of the frame, one mounted on the curved portion 15 of the frame and two mounted along the inclined portion 14 of the frame in spaced relation, although the number and arrangement of these holding clips may be varied as may be found desirable to firmly hold the frame in position in the window opening.

The frame is U-shaped in cross section, having a pair of parallel legs 26 between which the screen material 27 is mounted. Said screen is a reticulated member of either wire or plastic material, as may be found desirable. The vertical portion 22 of the screen frame and the connecting portion 16 thereof have hinge butts 28 and 29 secured thereto, the hinge butts being substantial duplicates. A flat piece of sheet material 30, which may be a transparent plastic material, is carried by the hinge butts 28 and 29, having a U-shaped hinge butt 31 pivoted to the hinge butts 28 and 29 by means of a pivot pin or rod 32. Another short transparent flat sheet material member 33, similar to the member 30, is also pivoted to the hinge butt 28 by means of the pin or rod 32, said member 33 having a hinge butt 34 provided thereon through which the pin or rod 32 extends.

It will be obvious from the above that a screen is provided that is firmly anchored in the window frame by means of the clips 19 due to the holding action of the spurs or prongs 24 and the short flanges or toe portions 20 of said clips being mounted in the groove or valley provided in the door frame. It will further be obvious that substantially the entire opening forwardly of the pivoted or swiveled window 5 is closed by means of the screen so as to prevent entrance of any bugs or insects into the interior of the automobile through the opening forwardly of said swiveled window, with the window either perpendicular to the door or at an oblique angle thereto such that the outer portion thereof exteriorly of the automobile lies forwardly of the inner portion thereof that is within the automobile body.

It will further be noted that no matter how the window is operated, whether by a crank or otherwise, as it is swung about its pivots from a position such as that shown in Fig. 2 to a position such that the portion thereof that extends outwardly from the automobile body lies forwardly of the portion that extends inwardly into the automobile body the flat hinged closure members 30 and 33 will engage the window pane 8 and the frame 7, respectively, in such a manner as to prevent any passage of insects or bugs between the rear of the screen frame and the swiveled window. The member 30, it will be noted, is so made that the entire length thereof will be in engagement with the window pane and it will also be noted that the pivoted wing 33 is free to pivot independently of the wing 30 so that the engagement of the wing 33 with the frame will in no manner interfere with the engagement of the wing 30 with the window pane. The pressure of the air striking the members 30 and 33 will hold these against the parts that the same engage in the position thereof shown in Fig. 2, and also in any position thereof in which the portion of the window that these engage is forwardly of that position shown in Fig. 2, these being the only positions in which insects would otherwise be deflected between the forward end of the window opening and the swiveled window. Insects will not be blown into the automobile body rearwardly of the swiveled window because the angular position of the window would deflect the insects and bugs away from the interior of the automobile body rather than toward the interior thereof.

What I claim is:

1. In an automobile door having a window opening and a window mounted in said opening to pivot about a substantially vertical axis spaced from the forward end of said opening; a screen mounted in said opening forwardly of said axis and outwardly of said window in closed position, said screen comprising a frame and a reticulated member mounted in said frame, and clips engaging said door mounted on said frame, said clips having portions lying between said frame and a portion of said door defining said opening and being adjustable relative to said frame.

2. In an automobile door having a window opening, a window mounted in said opening to pivot about a substantially vertical axis spaced from the forward end of said opening, and a compressible strip mounted in the margin of the opening defining portion of said door; a screen mounted in said opening forwardly of said axis, and clips mounted on said screen each having a portion lying between said margin and said strip and a prong on said portion engaging in said strip.

3. In an automobile door having a window opening and a window pivotally mounted in said opening on a substantially vertical axis spaced from the forward end of said opening; a screen mounted in said opening forwardly of said axis, there being a space between said window in open position and said screen, said screen having an outwardly directed wing pivotally mounted thereon engaging said window to close said space.

4. In an automobile door having a window opening and a window pivotally mounted in said opening on a substantially vertical axis spaced from the forward end of said opening, said window having a marginal frame and a window pane mounted in said frame, a screen mounted in said opening forwardly of said axis and having a wing shorter than said screen pivotally mounted and engaging said pane when said window is in open position and a second wing independently pivotally mounted on said screen and engaging said marginal frame.

5. In an automobile door having a window opening and a window pivotally mounted in said opening on a substantially vertical axis spaced from the forward end of said opening, a screen mounted in said opening outwardly of said window in the closed position thereof, said screen comprising a frame and a reticulated member mounted in said frame, said frame fitting between said window at its pivotal axis and the marginal walls of said opening forwardly of said window, said frame having a finger extending upwardly obliquely from one side at the upper end thereof.

6. A screen of the character described comprising a generally triangular frame rounded at its corners, Z-shaped clips adjustably detachably mounted on said frame and having prongs struck out from the intermediate portions thereof, and a reticulated member mounted in said frame.

7. A screen of the character described comprising a generally triangular frame rounded at its corners, a wing adjacent an edge of said frame pivotally mounted thereon to pivot about an axis parallel to said edge, and a reticulated member mounted in said frame.

8. A screen of the character described comprising a generally triangular frame rounded at its corners, a pair of wings adjacent an edge of said frame independently pivotally mounted thereon to pivot about a common axis parallel to said edge, and a reticulated member mounted in said frame.

LEE C. ROBERTS.

REFERENCES CITED

The following references are of record in the file of this patent:

UNITED STATES PATENTS

| Number | Name | Date |
|---|---|---|
| 2,019,105 | Van Voorhees | Oct. 29, 1935 |
| 2,019,127 | Flynn et al. | Oct. 29, 1935 |